(12) United States Patent
Clarke

(10) Patent No.: US 11,808,324 B2
(45) Date of Patent: Nov. 7, 2023

(54) LOCKING SHACKLE AND PIN

(71) Applicant: Graham Clarke, Victoria (CA)

(72) Inventor: Graham Clarke, Victoria (CA)

(*) Notice: Subject to any disclaimer, the term of this patent is extended or adjusted under 35 U.S.C. 154(b) by 92 days.

(21) Appl. No.: 17/129,295

(22) Filed: Dec. 21, 2020

(65) Prior Publication Data

US 2022/0136584 A1    May 5, 2022

(51) Int. Cl.
*F16G 15/06* (2006.01)
(52) U.S. Cl.
CPC ..................... *F16G 15/06* (2013.01)
(58) Field of Classification Search
CPC .................... F16G 15/06; Y10T 403/32893
See application file for complete search history.

(56) References Cited

U.S. PATENT DOCUMENTS

| | | | | |
|---|---|---|---|---|
| 2,124,912 A * | 7/1938 | Ehmann | ................. | F16G 15/06 411/956 |
| 4,337,614 A * | 7/1982 | Briscoe | ................. | F16G 15/06 411/518 |
| 5,114,260 A * | 5/1992 | Hart | ................. | F16G 15/06 403/24 |
| 6,023,927 A * | 2/2000 | Epstein | ................. | F16G 15/06 59/85 |
| 6,568,894 B2 * | 5/2003 | Golden | ................. | F16B 21/12 411/513 |
| 7,393,033 B1 * | 7/2008 | Bisso, IV | ................. | F16G 15/06 294/82.35 |
| 8,104,988 B2 * | 1/2012 | Lunn | ................. | F16G 15/06 403/317 |
| 2013/0074469 A1 * | 3/2013 | Robins | ................. | F16G 15/06 59/86 |

* cited by examiner

*Primary Examiner* — Robert Sandy
*Assistant Examiner* — Rowland Do
(74) *Attorney, Agent, or Firm* — Bennett Jones LLP

(57) ABSTRACT

A locking shackle for use with a pin having a protruding locking tab. The shackle defines (a) an entry eyehole has a non-linear insertion channel through which the locking tab may pass; and (b) a locking eyehole having an insertion channel through which the locking tab may pass, and a locking keyhole which releasably engages the locking tab when the pin is fully inserted into the shackle.

8 Claims, 7 Drawing Sheets

LOCKING SHACKLE AND PIN

FIELD OF THE INVENTION

The present invention relates to a locking shackle and pin.

BACKGROUND

A shackle is a U-shaped piece of metal secured with a clevis pin or bolt across the opening. The clevis pin is typically secured with a threaded nut, or a cotter pin, which may be inconvenient to use without a wrench or pliers, or not as secure as desired in some instances.

SUMMARY OF THE INVENTION

In general terms, the invention comprises a locking shackle and pin having an outside diameter and a protruding locking tab, wherein the shackle defines:
 (a) an entry eyehole having an internal diameter closely matching the external diameter of the pin, and a non-linear insertion channel through which the locking tab may pass;
 (b) a locking eyehole having an internal diameter closely matching the external diameter of the pin, and an insertion channel through which the locking tab may pass, and a locking keyhole which releasably engages the locking tab when the pin is fully inserted into the shackle.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

Figure 1:
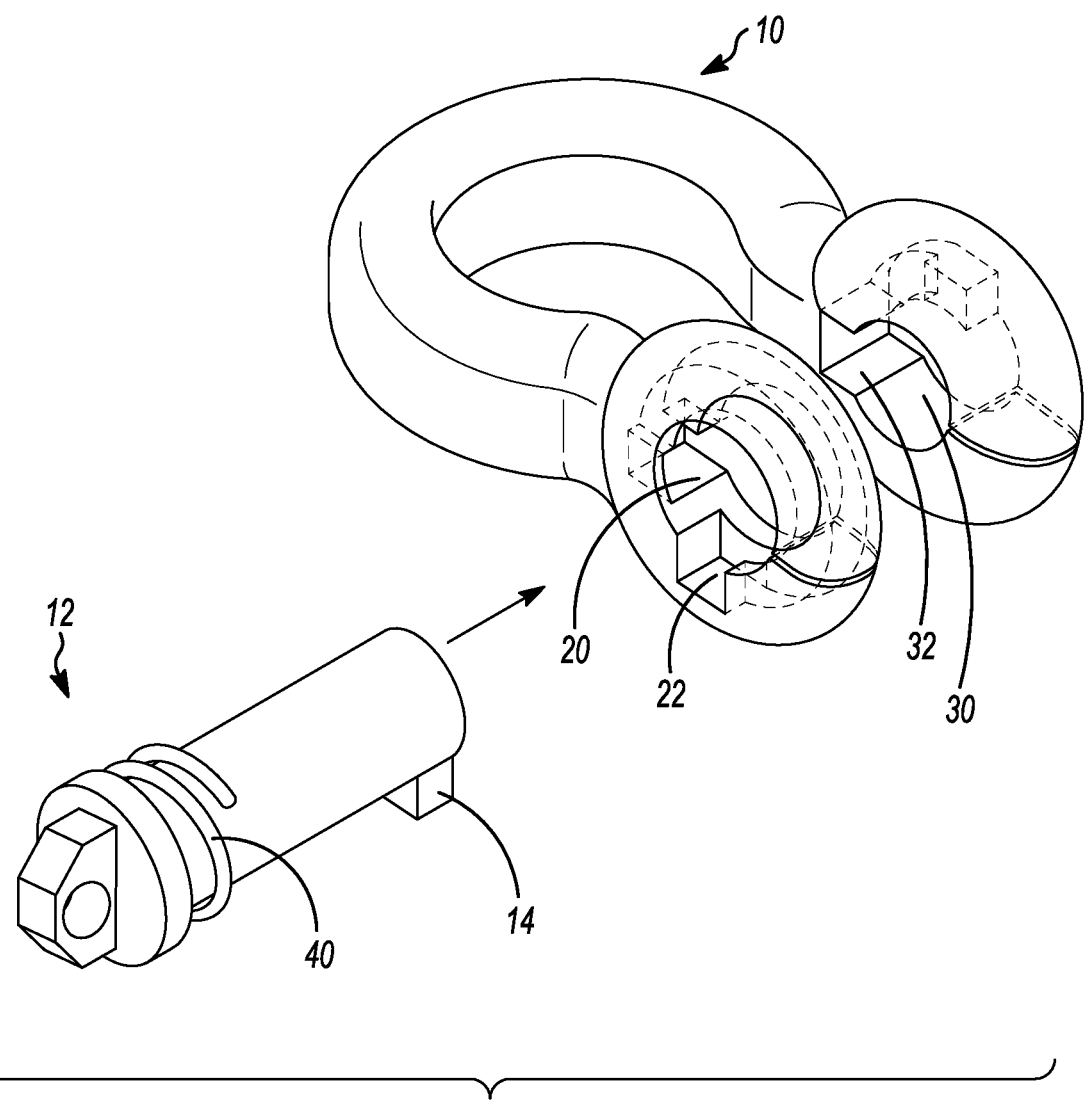
FIG. 1. Depictions of one embodiment of a shackle and pin of the present invention.

In general terms, the invention may comprise a locking shackle (10) and pin (12) having an outside diameter and a protruding locking tab (14), wherein the shackle (10) defines:
 (a) an entry eyehole (20) having an internal diameter closely matching the external diameter of the pin (12), and a non-linear insertion channel (22) through which the locking tab (14) may pass;
 (b) a locking eyehole (30) having an internal diameter closely matching the external diameter of the pin (12), and an insertion channel (32) through which the locking tab (14) may pass, and a locking keyhole (34) which releasably engages the locking tab (14) when the pin (12) is fully inserted into the shackle (10).

The entry eyehole (20) is configured such that the pin (12) may not fall out unintentionally as the shackle (10) is being positioned for use. As used herein, a "non-linear insertion channel" path means that the locking tab (14) may not pass directly through the entry eyehole (20) in a linear path. The insertion channel is configured such that some degree of axial rotation of the pin (12) and locking tab (14) is required in order to pass through the entry eyehole (20). Preferably, the non-linear insertion channel (22) comprises a first entry opening (24) and an exit opening (26) which is not aligned with the entry opening (24), and a central groove (28) in an internal surface of the eye-hole which links the entry opening (24) and the exit opening (26).

In one embodiment, the central groove (28) is aligned with a plane which is perpendicular to the longitudinal axis of the pin (12) when inserted into the shackle (10).

The locking eyehole (30) is configured such that the pin locking tab (14) may be inserted easily, but may then be locked into position, by rotation of the locking tab (14) to fit within a locking keyhole (34). In one embodiment, the pin (12) comprises a biasing means, such as a short spring (40), which acts on the pin (12) head to bias the pin (12) in a direction away from the locking eyehole (30). The spring (40) then biases the pin (12) in a removal direction (away from the locking eyehole (30), towards the entry eyehole (20)) into the locking keyhole. The locking keyhole has a shape which requires the pin (12) to be pushed against the spring (40) to be released from the locking keyhole (34). In one embodiment, the locking keyhole (34) has a notch, creating a shoulder (34A) which prevents rotation of the pin locking tab (12) when positioned within the keyhole.

With reference to FIGS. 2 to 8, exemplary embodiments of the removal of the pin (12) from the shackle (10) will now be described. Of course, one skilled in the art will recognize that insertion of the pin (12) merely involves the same steps in reverse order.

Figure 2:
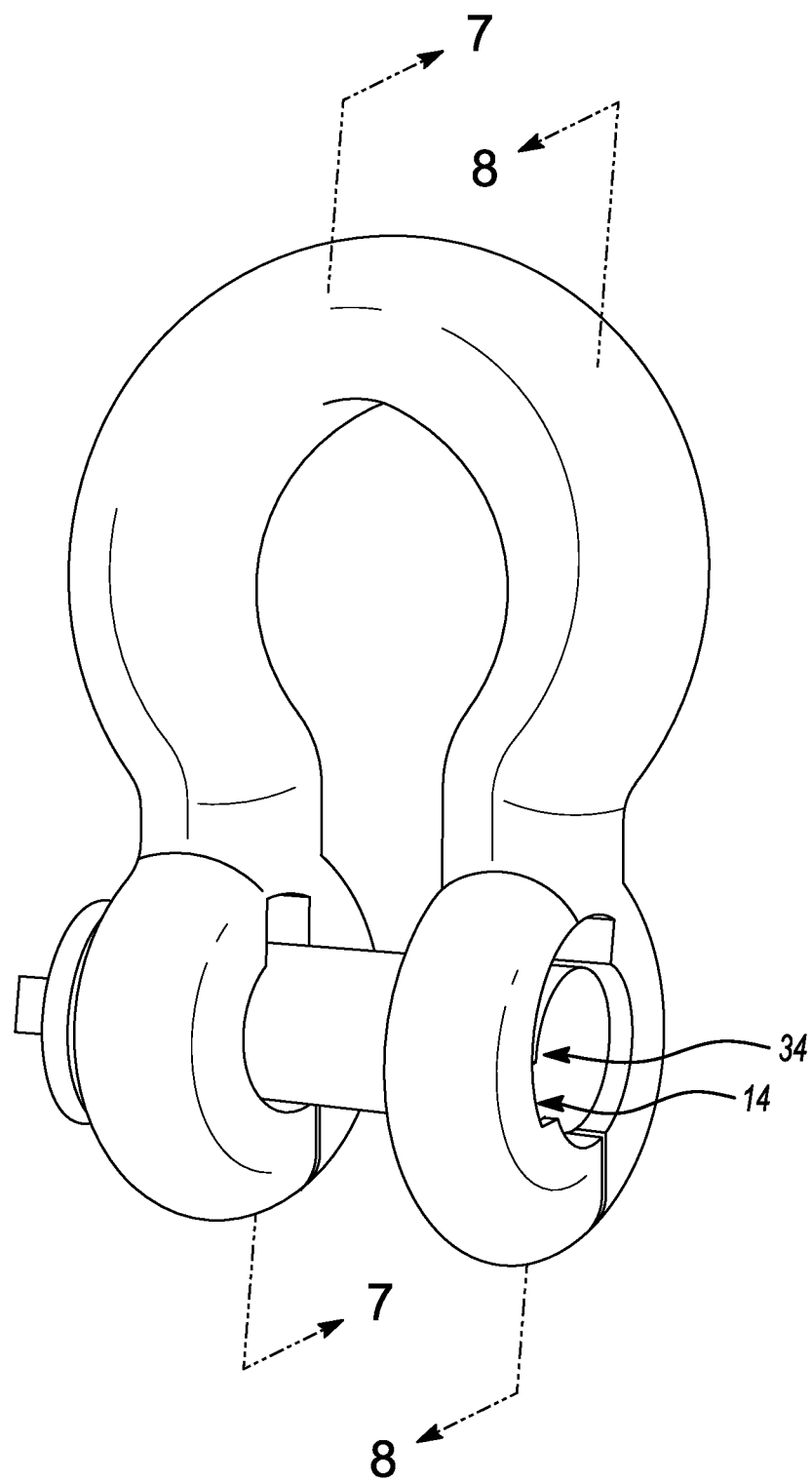
FIG. 2. Depiction of the pin in a locked position in the shackle.
Figure 3:
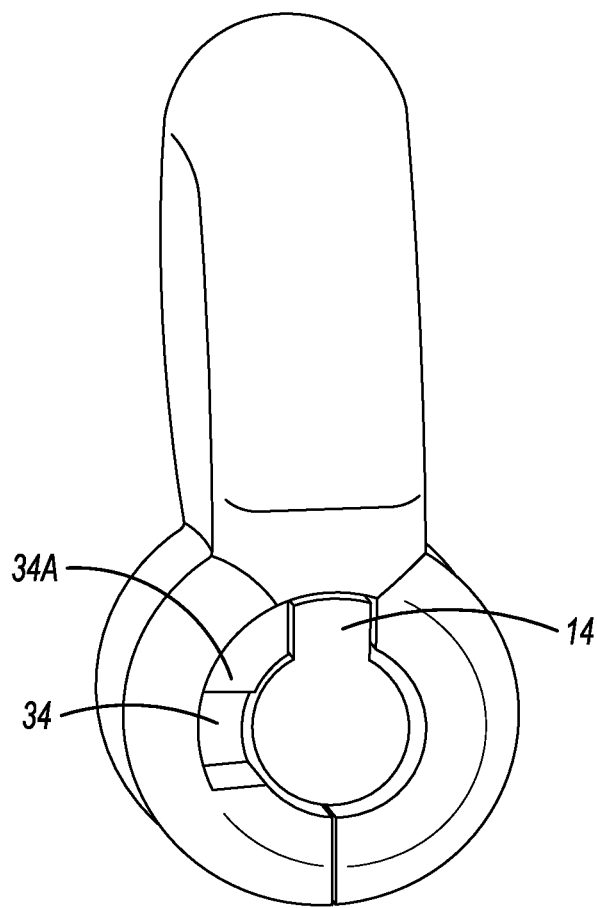
FIG. 3. Depiction of a pin in position ready to be removed from the locking eyehole.

FIG. 2 shows the pin (12) in a locked position, where the locking tab (14) is inserted fully into the locking keyhole (34). Removal of the pin (12) requires first a longitudinal push movement of the pin (12), against the biasing force of the spring (40), and a rotation of the pin (12) so the locking tab (14) is aligned with the locking eyehole (30) insertion channel (32), as shown in FIG. 3. Once aligned in the insertion channel, the pin (12) may be removed from the locking eyehole (30) by a linear longitudinal movement.

Figure 4:
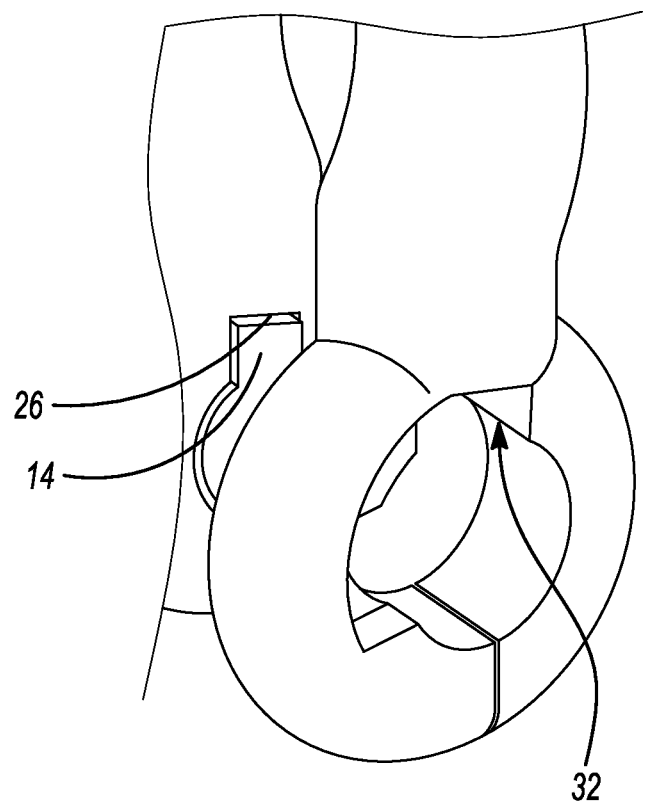
FIG. 4. Depiction of the pin after removal from the locking eyehole and entering the entry eyehole.
Figure 5:
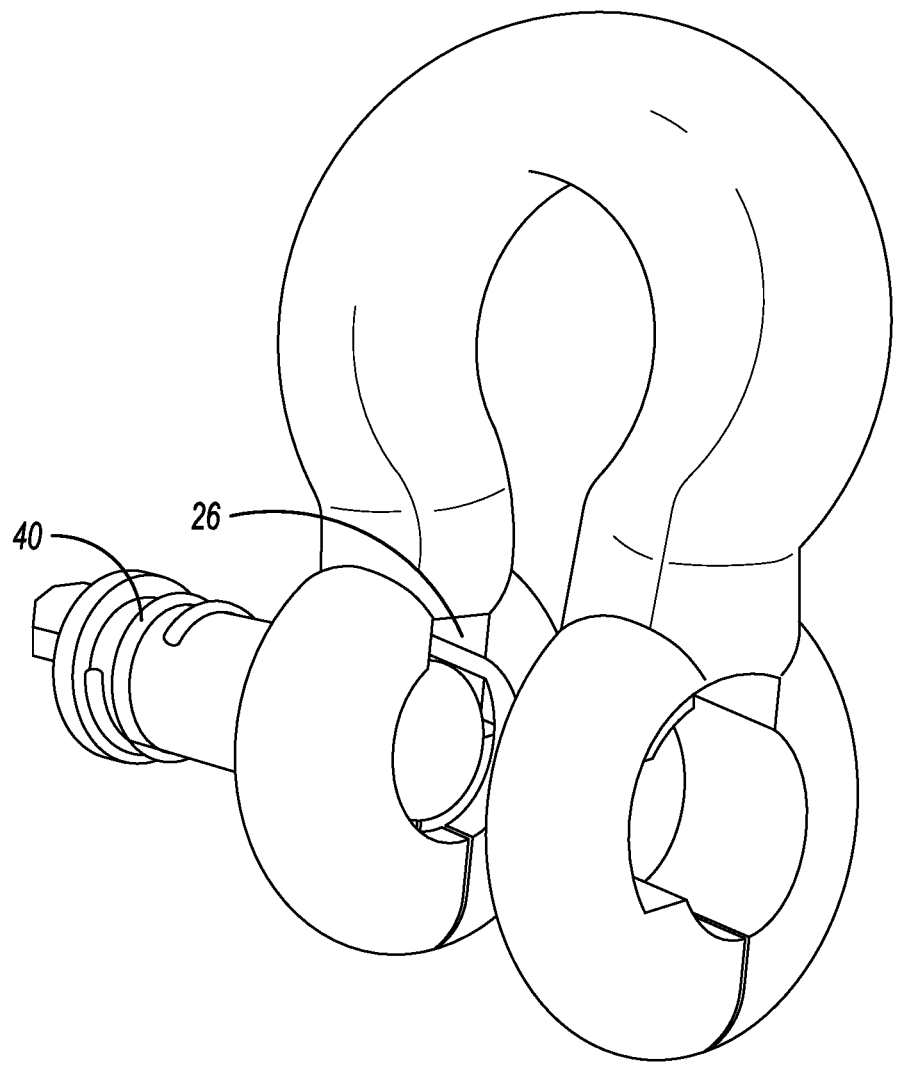
FIG. 5. Depiction of the pin passing through the non-linear channel of the entry eyehole.

The entry eyehole (20) non-linear insertion channel has an exit opening (26) which passes only partly through the shackle (10). The pin (12) locking tab may enter through the entry opening (24) as shown in FIG. 4. The pin (12) must then be rotated such that the locking tab follows the central groove (28) within the entry eyehole (20), until it aligns with the entry opening (24) on the side of the shackle (10) opposite the exit opening (26), as shown in FIG. 5.

Figure 6:
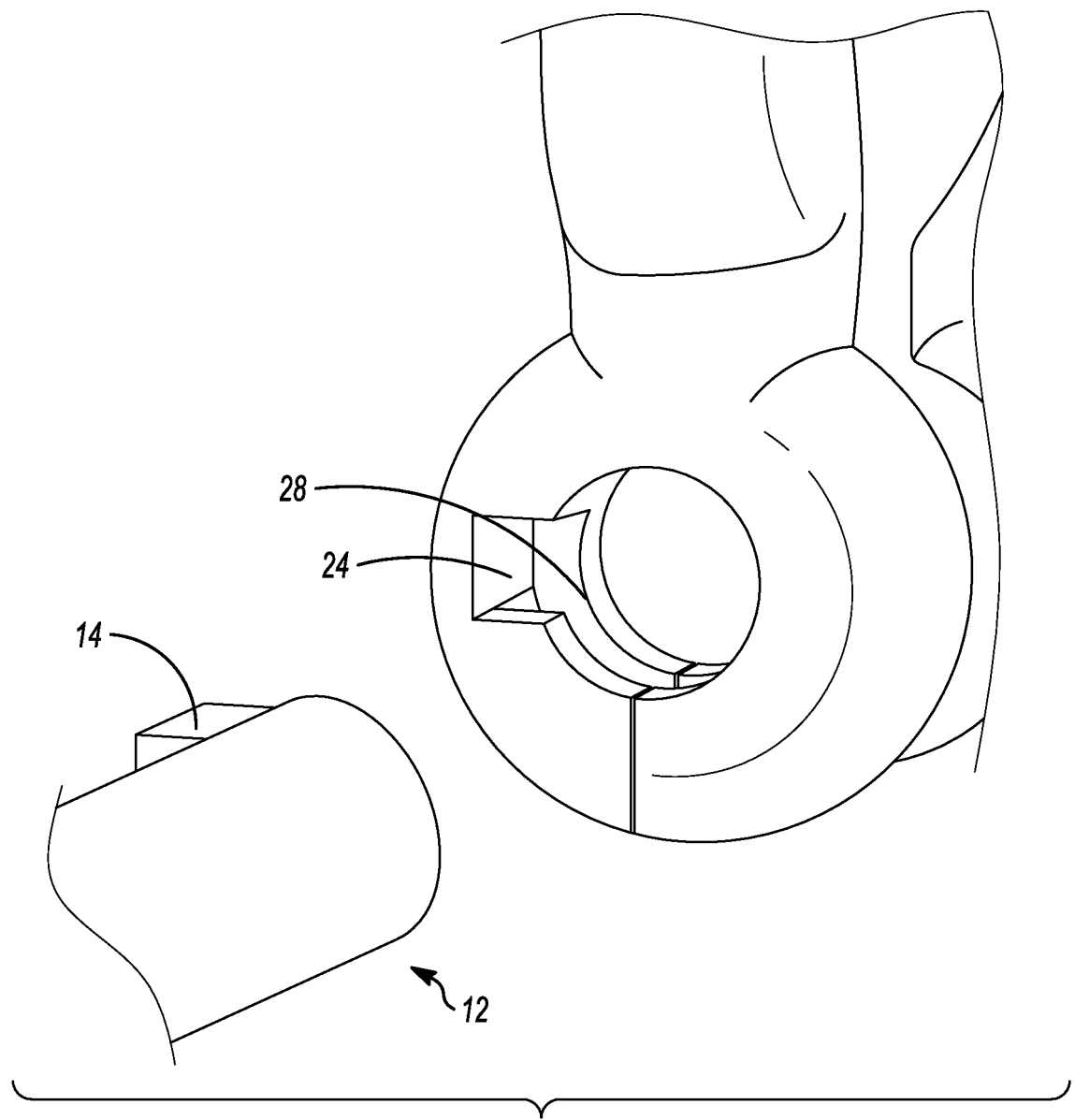
FIG. 6. Depiction of the pin after removal from the entry eyehole.
Figure 7:
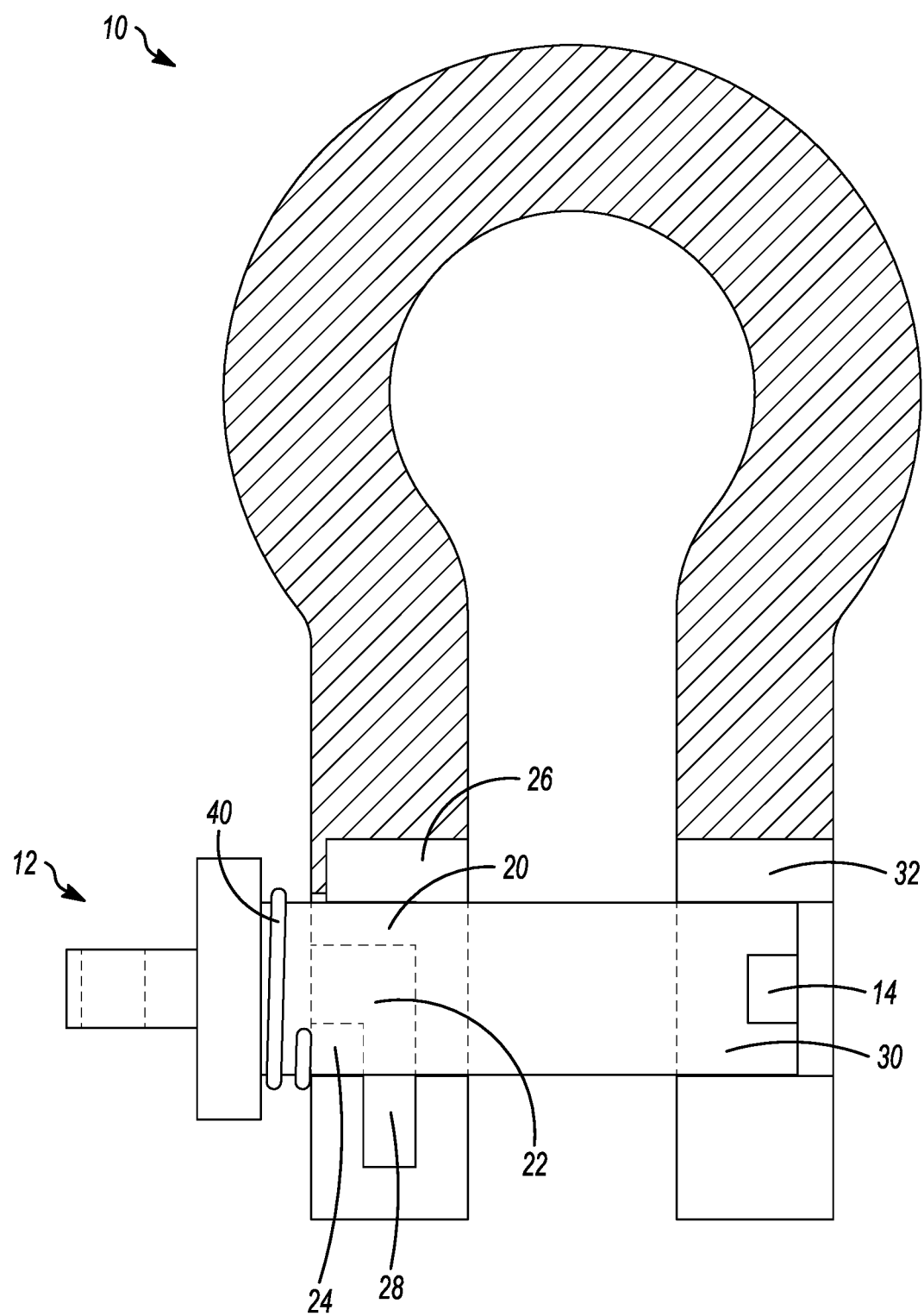
FIG. 7. Depiction of a cross-sectional view of the pin inserted into the shackle, taken along the section line 7-7 of FIG. 2.
Figure 8:
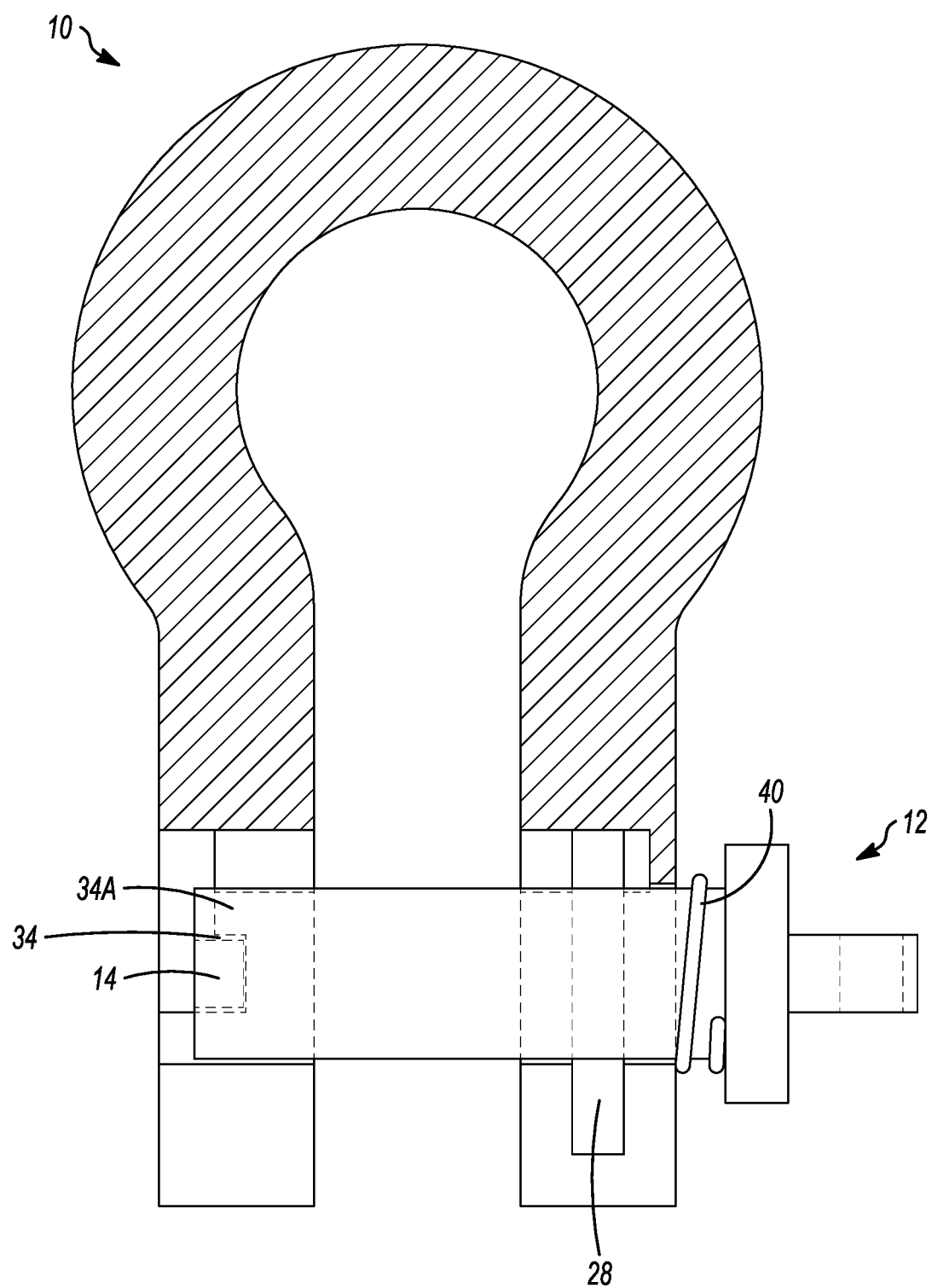
FIG. 8. Depiction of a cross-sectional view of the pin inserted into the shackle, taken along the section line 8-8 in FIG. 2.

Once aligned with the entry opening (24), the pin (12) may then be removed from the shackle (10), as shown in FIG. 6.

Interpretation and Definitions

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

What is claimed is:

1. A locking shackle for use with a pin having a protruding locking tab, wherein the shackle defines:
   (a) an entry eyehole having a non-linear insertion channel through which the locking tab may pass, wherein the non-linear insertion channel is configured to prevent the locking tab from passing through the entry eyehole along a linear path, and is further configured to require a degree of axial rotation of the locking tab for the locking tab to pass completely through the entry eyehole and the non-linear insertion channel;
   (b) a locking eyehole having an insertion channel through which the locking tab may pass, and a locking keyhole which releasably engages the locking tab when the pin is fully inserted into the shackle, upon rotation of the pin.

2. The shackle of claim 1 wherein the non-linear insertion channel is configured such that some degree of rotation of the pin and locking tab is required in order to pass through the entry eyehole.

3. The shackle of claim 2 wherein the non-linear insertion channel comprises a first entry opening and an exit opening which is not aligned with the entry opening, and a central groove in an internal surface of the eye-hole which links the entry opening and the exit opening.

4. The shackle of claim 3 wherein the central groove is aligned in a plane perpendicular to the longitudinal axis of the pin when inserted into the shackle.

5. The shackle of any one of claim 1, wherein the locking keyhole is rotationally displaced from the locking eyehole insertion channel.

6. The shackle of claim 5 wherein the locking keyhole defines a shoulder which prevents rotation of the locking tab when inserted into the locking keyhole.

7. The shackle of claim 1, wherein the shackle is adapted for use with a pin having a biasing means acting on the pin when fully inserted into the shackle, biasing the pin in a removal direction.

8. A shackle and pin combination, comprising:
   (a) a pin having a protruding locking tab,
   (b) a shackle defining, (i) an entry eyehole having a non-linear insertion channel through which the locking tab may pass, wherein the non-linear insertion channel is configured to prevent the locking tab from passing through the entry eyehole along a linear path, and is further configured to require a degree of axial rotation of the locking tab for the locking tab to pass completely through the entry eyehole and the non-linear insertion channel, and (ii) a locking eyehole having an insertion channel through which the locking tab may pass, and a locking keyhole which releasably engages the locking tab when the pin is fully inserted into the shackle, upon rotation of the pin.

* * * * *